TELEVISION RECEIVING SYSTEMS

Filed Dec. 30, 1955

INVENTOR.
DONALD A COMNINOS
BY Colin J Mitchell
ATTORNEY

United States Patent Office 2,901,537

Patented Aug. 25, 1959

2,901,537

TELEVISION RECEIVING SYSTEMS

Donald A. Comninos, Woodbury, N.J., assignor to Radio Corporation of America, a corporation of Delaware Application December 30, 1955, Serial No. 556,566

2 Claims. (Cl. 178—5.8)

The present invention relates to improvements in television signal receiving systems, and more particularly to improvements in home type television receiving systems of the inter-carrier sound variety.

In inter-carrier sound television receiving systems, care must be exercised to maintain the ratio of picture carrier signal intensity to sound carrier signal intensity above a predetermined minimum. This is especially important during reception of high signal strength signals. By maintaining the picture carrier at a sufficiently higher value than the sound carrier, cross modulation or cross talk between the picture and sound signals is reduced to an acceptably low value. If the ratio of the picture carrier to sound carrier becomes too small, a visible interference in the reproduced television picture is noticed resulting from a modulation of picture information by sound information.

In the design of low cost television receivers employing small diameter picture tubes, only a limited overall frequency band width is necessary to produce an acceptable television picture. In such receivers only the lower frequency components of the television picture signal are used in picture reproduction. Due to economy, the gain of the receiver is also generally marginal. In receivers of this type, it is frequently found that the reception of low intensity television signals results in excessive signal noise in the inter-carrier sound reproduction due to insufficient signal amplitude limiting of the inter-carrier sound carrier prior to frequency demodulation thereof. On the other hand, if weak signal sound reception is improved by lowering the ratio of picture to sound carrier response, the aforementioned cross modulation between picture and sound carriers, at high signal levels, degrades the quality of the reproduced picture.

It is, therefore, an object of the present invention to provide an improved television receiver in which useful sound reception is made possible over a greater range of received signal intensities.

It is another object of the present invention to provide an improved television receiving circuit in which cross modulation or interferences between sound and picture information is minimized during the reception of strong television signals.

In the realization of the above objects and feautres of advantage, the present invention involves the use of an improved intermediate frequency amplifier for a superheterodyne television receiving circuit. This intermediate frequency amplifier is provided with at least a first and second amplifier stage so connected that changes in the amplification of the second stage produces effective capacitance changes across the output circuit of the first amplifier stage. An automatic gain control voltage is then applied to at least the second stage so that the capacitance changes, looking into the second stage, will follow changes in received signal strength. A load circuit common to the output circuit of the first stage and the input circuit of the second stage is then provided, which has a double tuned characteristic to provide a peaked response at both the sound carrier frequency and the picture carrier frequency. The load circuit is further constructed to provide a higher Q response at the sound carrier frequency than at the picture carrier frequency, yet responsive to the capacitance changes imposed thereon by the second stage to produce an effective shift in the resonant frequency value of the picture carrier peak relative to the sound carrier peak. This results in a changing picture carrier to sound carrier ratio characteristic which is a positive function of received signal strength in a manner optimizing overall reception for a wide range of signal intensity values.

A better understanding of the present invention will be obtained through a reading of the following specification, especially when taken in connection with the accompanying drawings in which.

Figures 1, 2:
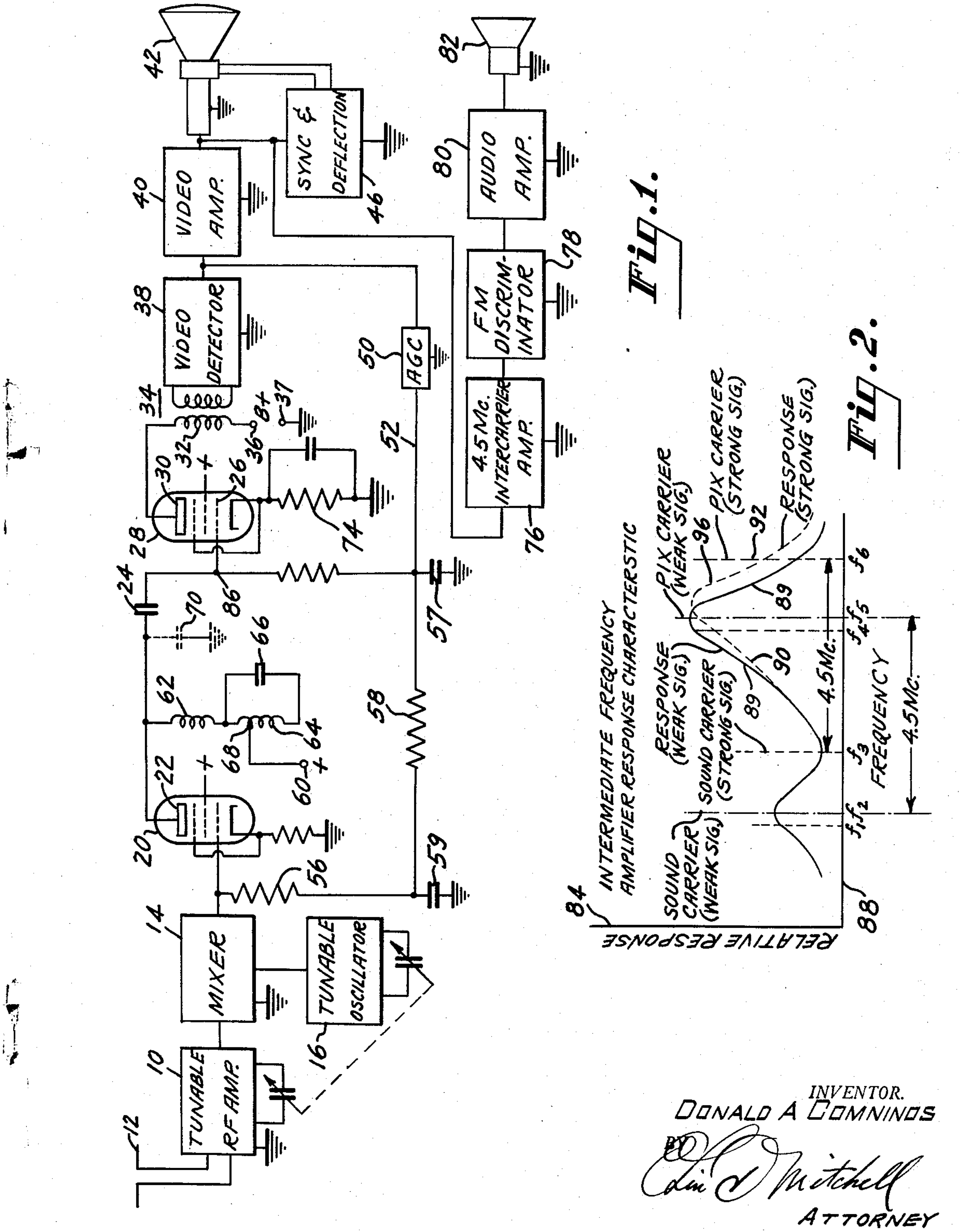
Fig. 1 is a combination schematic and block diagram representation of an inter-carrier sound television receiver embodying the present invention.
Fig. 2 is a graphic representation of certain characteristics of the circuit shown in Fig. 1 typifying the operation of the present invention.

Turning now to Fig. 1, there is shown in block form at 10 a conventional tunable radio frequency amplifier suitable for accepting and amplifying broadcast television picture and television sound carriers. The radio frequency amplifier 10 is supplied with received radio signals by the antenna 12. Output signals in the radio frequency amplifier are conventionally applied to the superheterodyne mixer 14 in which the received signals are heterodyned with signals provided by tunable local osciltaltor 16. According to conventional practice, the amplifier 10 and oscillator 16 are tunably tracked with one another to effectuate conversion of all signals passed by amplifier 10 to a given range intermediate frequencies of lower frequency than the received radio signals. The output signals delivered by the mixer 14 will then correspond to a reduced frequency version of the received modulated television picture and sound carriers, and may be referred to as the intermediate frequency picture and sound carriers.

The intermediate frequency signals delivered by the mixer 14 are applied to the input circuit of an intermediate frequency amplifier 20, whose anode 22 is capacitively coupled, via capacitor 24, to the control electrode 26 of a second intermediate frequency amplifier 28. The anode 30 of the intermediate frequency amplifier 28 is connected through the primary winding 32 of transformer 34 to a source of positive biasing potential (not shown) having a terminal at 36. The positive potential appearing at terminal 36 is conventionally referenced with respect to circuit ground indicated at 37. The secondary winding of the intermediate frequency transformer 34 is coupled to a video detector 38 whose output signals are conventionally applied to a video amplifier 40. Video amplifier 40 is further operatively coupled with a kinescope 42 for defining intensity variations in the reproduced television picture. The well known synchronizing and deflection circuits associated with the kinescope 42 are indicated by the block 46.

Also connected with the output of the video detector 38 is an automatic gain control circuit 50 which may be of any conventional form which will develop at the A.G.C. bus 52, a varying gain control voltage of a nature reducing the gain of the amplifier 28 during the reception of stronger intensity television signals. If desired, the control electrode of vacuum tube 20 may also be connected, as shown, through a resistor 56 to the A.G.C. bus 52 for automatic gain control of the first video IF amplifier stage. Conventional A.G.C. filter components 57, 58 and 59 are also shown. In practice, it may be further desired to provide another stage of intermediate frequency amplification between the amplifier 28 and the detector 38. In such an event, the stage need not necessarily be controlled by automatic gain control voltage.

Inter-carrier sound signal carrier, resulting from the beat or heterodyne between the intermediate frequency picture carrier and intermediate frequency sound carrier (separated by the standard 4.5 megacycle frequency difference), is extracted from the output of video amplifier 40. A connection is shown from the output of amplifier 40 to the input of a 4.5 megacycle amplifier 76. The output of the amplifier 76 is conventionally connected to a frequency discriminator 78 which demodulates the frequency variations of the intercarrier sound signal carrier attributable to FM sound modulation of the sound carrier and applies the resulting signal to the sound amplifier 80 connected with speaker 82.

The general form of the circuit shown in Fig. 1 thus far described is quite conventional. However, in accordance with the present invention, the anode 22 of the first video amplifier stage 20 is supplied with positive operating bias from power supply terminal 60 through a compound load circuit comprising inductor 62, inductor 64 and capacitor 66. In accordance with the present invention, positive power supply potential is applied to a tap 68 on the inductor 64 so that only a relatively small portion of the inductor 64 is directly included in the anode circuit of tube 20. In accordance with the present invention, the value of the inductor 62 taken in combination with the effective value of the portion of the inductor 64 directly included in the anode circuit of the amplifier 20 are chosen such that resonance is established with existing circuit capacitances (represented by the dotted line capacitor 70) in the range of the intermediate frequency representations of the intermediate frequency picture carrier. Capacitance 70 includes the input and "Miller Effect" capacitances to tube 28. On the other hand, the value of the inductor 64 taken in combination with the capacitor 66 is caused to form a resonant circuit in the range of the television sound carrier intermediate frequency.

The graphical representation of Fig. 2 will make clear the relative resonant conditions provided by the inductors 62 and 64 respectively. The ordinate 84 of the graph in Fig. 2 depicts relative response of the amplifier 20 as viewed at terminal 86 corresponding to the input circuit of the second amplifier tube 28. Along the abscissa 88 is presented various values of frequency in the range $f_1$ to $f_6$ corresponding to the lowest frequency value assumed by the television sound carrier and highest frequency value assumed by the television picture carrier as a result of tuning the oscillator 16. As shown by the intermediate frequency response characteristic 89 in Fig. 2, the television sound carrier may be represented by intermediate frequencies in the range $f_1$ to $f_3$ with the value $f_2$ being assigned as the nominal value of the intermediate frequency sound carrier. Likewise, as a result of tuning the oscillator 16, the television picture carrier may be caused to assume intermediate frequency values in the range $f_4$ to $f_6$. With the nominal value of the intermediate frequency sound carrier established at $f_2$, the nominal value of the intermediate frequency picture carrier will be established at $f_5$, exactly 4.5 megacycles displaced from $f_2$. This is inherent due to the aforementioned presently established television standards which establishes a 4.5 megacycle difference between the broadcast television picture radio carrier and television sound radio picture carrier as received by the antenna 12. Since the intermediate frequency sound carrier $f_2$ follows the frequency modulation of the broadcast radio sound carrier the resulting beat between the carriers $f_2$ and $f_5$, due to inherent non-linearities in the circuit employing amplifiers 20 and 28, will produce the 4.5 megacycle inter-carrier beat applied to the amplifier 76 in accordance with conventional practice.

In accordance with the present invention, the Q of the tuned circuit comprising inductor 64 and capacitor 66 is made substantially higher than the effective Q of the tuned circuit involving inductor 62 and circuit capacitances 70. In further accordance with the present invention, the inductor 62, in combination with the capacitances 70, is tuned to correspond to the nominal value $f_5$ of the intermediate frequency picture carrier under conditions of low signal strength, while inductor 64 and capacitor 66 are, under the same signal intensity conditions, tuned to the intermediate frequency sound carrier $f_2$. It can then be seen that the overall response of the television receiver under these conditions will be maximum at the picture and sound carriers. However, to avoid objectionable cross modulation between picture and sound carriers, the relative response of the intermediate frequency amplifier should be made at least ten to fifteen times lower at the intermediate frequency sound carrier $f_2$ than its response at the intermediate frequency picture carrier $f_5$. This is accomplished by adjusting the Q of the inductor 62 in combination with capacitor 70, so that the response of the compound load circuit contributed by inductor 62 and capacitor 70 is sufficiently low at frequency $f_2$ that even when boosted or accentuated by the resonance of the tuned circuit 64—66, the amplitude of the sound carrier is adequately lower than the amplitude of the picture carrier.

Under the conditions of weak signal reception the characteristic depicted by curve 89 in Fig. 2 will, due to the peak at the sound carrier $f_2$, minimize the possibility of noise interference in the reproduced intercarrier sound. This is due to well known amplitude limiting of higher amplitude signals in the conventional intercarrier amplifier and discriminator 76 and 78. Under these conditions, the likelihood of cross modulation between sound and picture is rather great. However, picture quality will be somewhat lower due to received signal noise. Also with the characteristic depicted by the curve 89 in Fig. 2, the effective definition of the received television picture will be somewhat limited due to the downward sloping portion extending from the frequency $f_5$ down to the frequency $f_3$. However, in accordance with the present invention, should a strong television signal be received, the negative potential delivered by the automatic gain control circuit 50, and applied to the A.G.C. bus 52, will reduce the amplification of the amplifier 28. This, in accordance with well known principles, will reduce the aforementioned "Miller Effect" input capacitance to the amplifier 28 appearing at terminal 86. This will reduce the effective circuit capacitance in shunt with the inductor 62 which will increase the resonant frequency of the tuned circuit comprising the inductor 62. The result of this is shown by the dotted line response characteristic 90 depicted in Fig. 2. Due to the fact that only a small portion of the inductor 64 is included in the load circuit of the amplifier 20, the input capacitance change of the amplifier 28, resulting from increased A.G.C. bias, will not appreciably affect the resonant frequency of the inductor capacitance combination 68—66. The result is that the lower frequency peak of the amplifier characteristic shown centered about $f_2$ will remain substantially unchanged.

Under the aforementioned conditions of increased signal strength, the operator of the television receiver will be urged to retune the oscillator 16 to see if an even better appearing picture may be made to appear on the kinescope 42. In thus tuning the oscillator 16, the absolute frequency of the sound and picture intermediate frequency carriers will be increased to a point where the picture carrier lies at a substantially 50% response point on the altered response current 90 of the amplifier. This is shown as frequency $f_6$ which intersects the curve 90 at the 50% point indicated at 92. Under these conditions, the appearance of the television picture will be improved due to the attenuation of lower frequency components and an improvement in the balance between low and high frequency components as is required in present day vestigial side-band television broadcasting techniques. This, however, also occasions a corresponding repositioning of the sound carrier relative to the overall response current of the amplifier as shown by the dotted $f_3$ and its intersection with the frequency response curve. Frequency $f_3$ is, of course, displaced from frequency $f_6$ by the required 4.5 megacycles. By this the resulting picture to sound carrier ratio will be increased due to the fact that the response of the amplifier to frequency $f_3$ is less than that at the previous sound carrier frequency $f_2$. This improves inter-carrier sound receiving conditions by making cross modulation between picture carrier and sound carrier less likely. Picture quality will also tend to improve due to an effective increase in the highest video frequency represented by intermediate frequency components since a broadening of the intermediate frequency picture signal response has, to a certain extent, been effectuated.

It is, therefore, seen that the practice of the present invention makes possible the provision of a simple television receiving circuit which in effect automatically alters its characteristics so as to provide optimized reception of television and sound carrier signals under varying conditions of received signal strength. Under conditions of reduced signal strength, the ratio between picture and sound carrier is reduced so as to enhance the noise limiting action on the inter-carrier sound signal by the receiver. Upon the reception of higher intensity television and sound carriers, that overall frequency response of the receiver needed for best picture reception and improvement in inter-carrier sound reception is realized such that an increase in the picture to sound carrier ratio is effectuated and the overall frequency balance of the demodulated video signal is improved so as to give a better appearing picture.

Having thus described my invention, what is claimed is:

1. In a television receiver including tuner apparatus for receiving signals comprising a modulated picture carrier and an accompanying modulated sound carrier and for converting said received signals to intermediate frequencies, said tuner apparatus having fine tuning means for controllably adjusting the precise intermediate frequencies to which said picture and sound carriers are converted, said receiver also including automatic gain control apparatus for developing a gain control voltage varying in accordance with variations in strength of the received signals; an intermediate frequency amplifier including a first amplifying device having an input circuit and an output electrode, the input circuit of said first amplifying device being coupled to said tuner apparatus; a second amplifying device having an input electrode and presenting an input capacitance between said input electrode and a point of reference potential; means for applying said gain control voltage to said input electrode in such polarity and magnitude that said input capacitance is caused to vary inversely with respect to changes in the strength of said received signals; and an interstage coupling network comprising a first parallel resonant circuit including a first inductance, a second parallel resonant circuit including a second inductance, means for connecting said first and second inductances in series, means for coupling said output electrode to said input electrode, means for connecting said first inductance to said electrode coupling means, said first resonant circuit being tuned to resonate under weak signal conditions at a first intermediate frequency, said second resonant circuit being tuned to resonate under weak signal conditions at a second intermediate frequency differing from said first intermediate frequency by an amount substantially equal to the frequency difference between said received picture and sound carriers, and means for causing the difference between the resonant frequency of said first and second resonant circuits to exceed the picture-sound carrier frequency difference under strong signal conditions, said last named means comprising means for connecting an intermediate point on said second inductance to said point of reference potential whereby a decrease in said input capacitance caused by an increase in signal strength results in a greater change in the resonant frequency of said first resonant circuit than in the resonant frequency of said second resonant circuit.

2. Apparatus in accordance with claim 1 wherein the tuning of said first resonant circuit under weak signal conditions provides the frequency response characteristic of said interstage coupling network with a peak at said first intermediate frequency and the tuning of said second resonant circuit under weak signal conditions provides said frequency response characteristic with a second peak at said second intermediate frequency, said second peak being substantially lower in level than said first peak, an optimum adjustment of said fine tuning means under weak signal conditions placing said converted picture and sound carriers at said first and second intermediate frequencies, respectively.

References Cited in the file of this patent

Rider Television Manual, vol. 7, Philco, page 7–56, John F. Rider, New York, 1951.